United States Patent
Todd et al.

(10) Patent No.: US 9,835,275 B2
(45) Date of Patent: Dec. 5, 2017

(54) FLEXIBLE PIPE FITTING

(71) Applicant: CUTTING EDGE FITTINGS AND MORE, LLC, Rockport, IN (US)

(72) Inventors: Dennis R. Todd, Richland, IN (US); Daniel R. Todd, Rockport, IN (US); Evan M. Young, Richland, IN (US)

(73) Assignee: Cutting Edge Fittings & More, LLC, Rockport, IN (US)

( * ) Notice: Subject to any disclaimer, the term of this patent is extended or adjusted under 35 U.S.C. 154(b) by 0 days.

(21) Appl. No.: 14/290,964

(22) Filed: May 29, 2014

(65) Prior Publication Data

US 2014/0319821 A1  Oct. 30, 2014

Related U.S. Application Data

(63) Continuation-in-part of application No. 13/849,610, filed on Mar. 25, 2013, now abandoned.

(51) Int. Cl.
| | | |
|---|---|---|
| F16L 21/00 | (2006.01) | |
| F16L 37/50 | (2006.01) | |
| F16L 13/11 | (2006.01) | |

(52) U.S. Cl.
CPC .......... F16L 21/007 (2013.01); F16L 13/116 (2013.01); F16L 37/50 (2013.01)

(58) Field of Classification Search
CPC ..... F16L 13/116; F16L 21/007; F16L 27/107; F16L 47/06; F16L 37/50; F16L 27/113
USPC .... 285/133.3, 302, 237, 223, 226, 227, 231, 285/235, 184, 234
See application file for complete search history.

(56) References Cited

U.S. PATENT DOCUMENTS

| | | | |
|---|---|---|---|
| 381,826 A | | 4/1888 | Brinckerhoff |
| 1,352,102 A | | 9/1920 | Tatro |
| 2,079,063 A | | 5/1937 | Brosius |
| 2,219,752 A | | 10/1940 | Rohr |
| 2,251,718 A | | 8/1941 | Parker |
| 2,286,565 A | | 6/1942 | Norton |
| 2,331,020 A | | 10/1943 | Frances |
| 2,768,008 A | | 10/1956 | Rheem |
| 2,791,450 A | * | 5/1957 | Hombach ................. 285/133.3 |
| 2,904,356 A | | 9/1959 | Love |

(Continued)

Primary Examiner — Gregory J Binda
Assistant Examiner — Zachary T Dragicevich
(74) Attorney, Agent, or Firm — C. Richard Martin; Martin IP Law Group (57) ABSTRACT

A flexible pipe fitting for joining a first length of pipe to a second length of pipe at an arbitrary angle is provided. The apparatus includes a primary fitting having a substantially circular opening at a first end thereof for receiving an end of a first length of pipe, and an enlarged opening at a second end thereof for receiving a first flexible coupling member. The first flexible coupling member includes an outer wall having an outer surface engaging an inner surface of the enlarged opening, and an inner wall having a lower end connected to a lower end of the outer wall. The inner wall further includes a substantially circular opening therein for receiving a second, rigid member. The inner surface of the second, rigid member is configured to receive an end of the second length of pipe. The enlarged opening in the primary fitting is preferably fish-mouth shaped, or alternatively, cone shaped. Adhesive, such as PVC cement may be used to bond the various fittings, and lengths of pipe together to form a sealed joint.

11 Claims, 11 Drawing Sheets

(56) References Cited

U.S. PATENT DOCUMENTS

| | | | |
|---|---|---|---|
| 4,184,516 A | | 1/1980 | Oesterritter et al. |
| 4,917,408 A | | 4/1990 | Vidrine et al. |
| 5,390,960 A | * | 2/1995 | Blake ................................ 285/3 |
| 5,704,656 A | * | 1/1998 | Rowe ........................ F16L 5/02 |
| 6,189,550 B1 | * | 2/2001 | Stickel .................... F04B 53/00 |
| | | | 285/235 X |
| 6,477,220 B1 | * | 11/2002 | Wivagg ................ F16L 27/108 |
| | | | 285/139.2 |
| D476,074 S | | 6/2003 | Stout, Jr. |
| 7,258,372 B2 | | 8/2007 | Kronmeyer |
| 2001/0039953 A1 | | 11/2001 | McCoy |
| 2005/0012329 A1 | | 1/2005 | Brown |
| 2006/0012165 A1 | * | 1/2006 | Brockway et al. ........ 285/139.3 |
| 2006/0012166 A1 | | 1/2006 | Siferd et al. |
| 2008/0229800 A1 | | 9/2008 | Santeler |
| 2010/0295293 A1 | | 11/2010 | Healy et al. |
| 2012/0074686 A1 | * | 3/2012 | Chang .................... F16L 37/50 |

\* cited by examiner

FLEXIBLE PIPE FITTING

FIELD OF THE INVENTION

The present invention relates generally to pipe fittings, and methods of assembling pipe fittings, and in particular to a flexible pipe fitting and method for assembling pipes at various angles.

BACKGROUND OF THE INVENTION

A variety of fittings and connectors have previously been developed for joining fluid-conveying pipes and other components. Common connectors include couplings, crosses, elbows, tees, unions and wyes. These connectors are used to join two lengths of pipe, such as PVC pipe for carrying fluids. Elbows are used to account for direction changes in the pipe string. Common elbow fittings are at fixed angles and include 90 degree elbows, 45 degree elbows, and 22½ degree elbows.

Flexible couplings, such as those manufactured by Fernco, also exist in the marketplace. While flexible, these couplings are limited in their range of motion to approximately 5 degrees and cost significantly more than standard PVC pipe. Further, these couplings require pipe clamps to be placed at each end of the fitting to secure the coupling to the pipe, and are made of rubber.

Swivel or ball fittings, such as are disclosed in U.S. Pat. No. 2,286,565, have also been used to allow for connecting pipes that are not aligned at angles which are common to elbow fittings as discussed above. However, these types of fittings have multiple additional parts and components, such as o-rings, compression fittings and the like, that can create additional opportunities for leakage.

SUMMARY OF THE INVENTION

The present invention overcomes these limitations by providing a variable fitting that has no gaskets, swivels, or moving parts that could leak. The device and method of the present invention are intended to replace existing pipe fittings that only provide for a fixed angle or are made of flexible materials that are inferior due to the lack of rigidity and increased risk of failure or blockage.

Use of the present invention allows for joining of two pipes together at arbitrary angles. It also replaces the need to stock several fixed angle pipe fittings, such as 45 degree and 22½ degree fittings.

According to one aspect of the present invention, there is provided an apparatus for joining a first length of pipe to a second length of pipe at an arbitrary angle. The apparatus includes a primary fitting having a substantially circular opening at a first end thereof for receiving an end of said first length of pipe, and an enlarged opening at a second end thereof. A first flexible coupling member may be positioned in the enlarged opening. The first flexible coupling member includes an outer wall having an outer surface engaging an inner surface of the enlarged opening, and an inner wall having a lower end connected to a lower end of the outer wall. The inner wall further includes a substantially circular opening therein for receiving an end of the second length of pipe.

A further aspect of the invention includes a second, rigid member having an outer surface engaging the substantially circular opening of the inner wall. An inner surface of the second, rigid member is configured to receive the end of the second length of pipe.

Yet another aspect of the present invention is the use of an adhesive interposed between the various components of the apparatus for bonding the components together.

According to another aspect of the present invention, the first, flexible member may be formed of a polymeric material that is strong, resilient and unaffected by soil conditions. That material may be inert and resistant to chemicals, ultraviolet rays, fungus growth, and normal sewer gases. In addition, the polymeric material may be leak-proof, root-proof and seals against infiltration and exfiltration. Preferably, the polymeric material may be elastomeric polyvinyl chloride (PVC). Similarly, the primary fitting and the second, rigid member may preferably be formed of a rigid plastic material selected from a group consisting of PVC, CPVC, ABS, SDR 21, SDR 26 and SDR 35.

According to a further aspect of the invention, the enlarged opening is fish-mouth shaped to allow for a significant range of motion. Alternatively, the enlarged opening may be substantially cone shaped.

These and other objects, features and advantages of the present invention will become apparent with reference to the text and the drawings of this application.

DETAILED DESCRIPTION OF PREFERRED EMBODIMENTS

As best shown in FIGS. 1-6, the present invention is an innovative flexible pipe connector 10 having a primary fitting 12 which has a substantially circular opening 14 at a first end thereof, and a fish-mouth shaped opening 16 and a second end thereof. The circular opening 14 at the first end is configured to receive an end of a pipe 20 therein. The size of the circular opening 14 corresponds to the exterior diameter of the pipe to be received therein such that a tight, friction fit is created. For example, standard PVC and CPVC pipe, schedule 40 and schedule 80, used in plumbing applications have nominal diameters of ½", ¾", 1", 1¼", 1½", 2", 2½", 3", 4", 5", 6", 8", 10", 12", 14" and 16". The circular opening 14 may preferably be sized to accommodate one of these pipe sizes. Alternatively, the fish-mouth shaped opening 16 can be formed directly into the end of a length of pipe. The specific geometry of the fish-mouth opening 16 can be varied to accommodate a greater or lesser range of angles without departing from the spirit of the invention. An infinite number of angles between 0 degrees and 42 degrees can be achieved.

Figure 1:
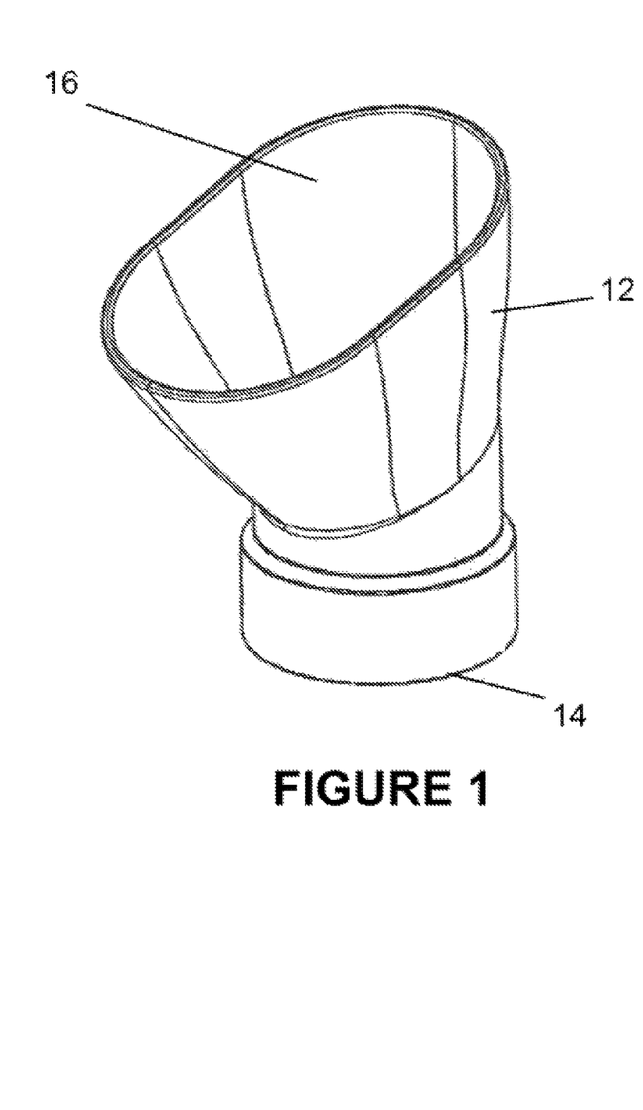
FIG. 1 is a front perspective view of a fish mouth pipe fitting according to a presently preferred embodiment of the invention.
Figure 2:
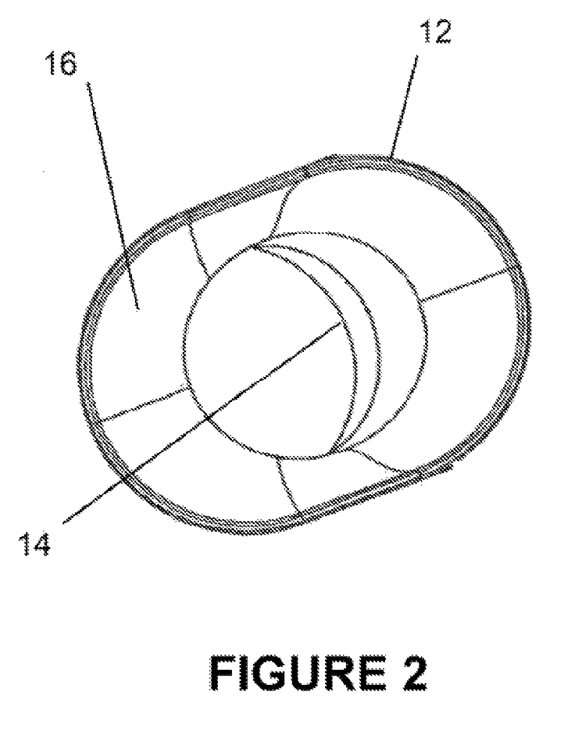
FIG. 2 a top view of the fish mouth pipe fitting shown in FIG. 1.
Figure 3:
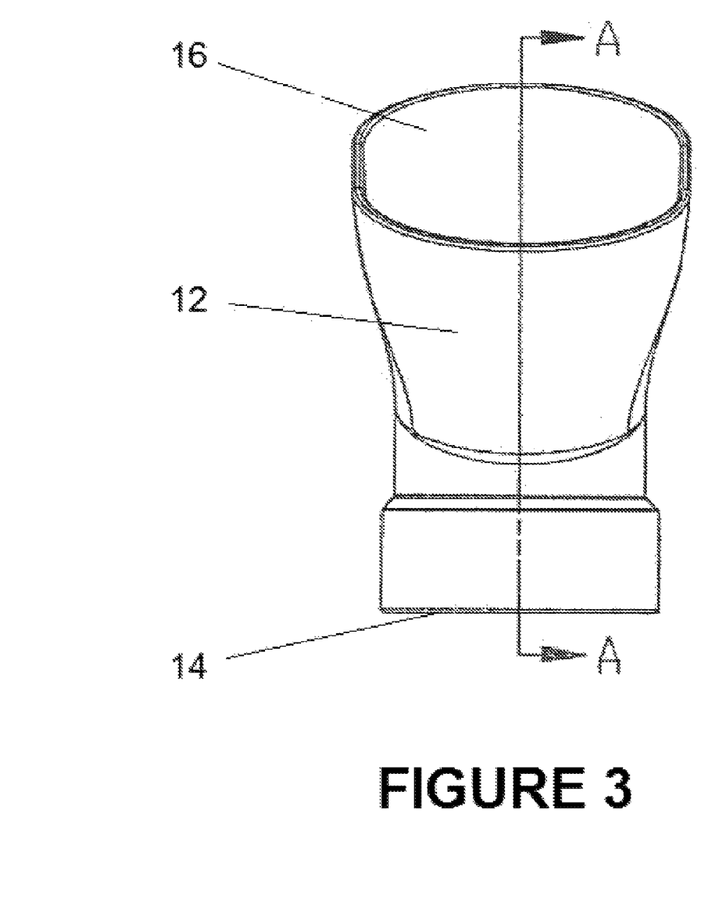
FIG. 3 is a front elevation view of the fish mouth pipe fitting shown in FIG. 1.
Figure 4:
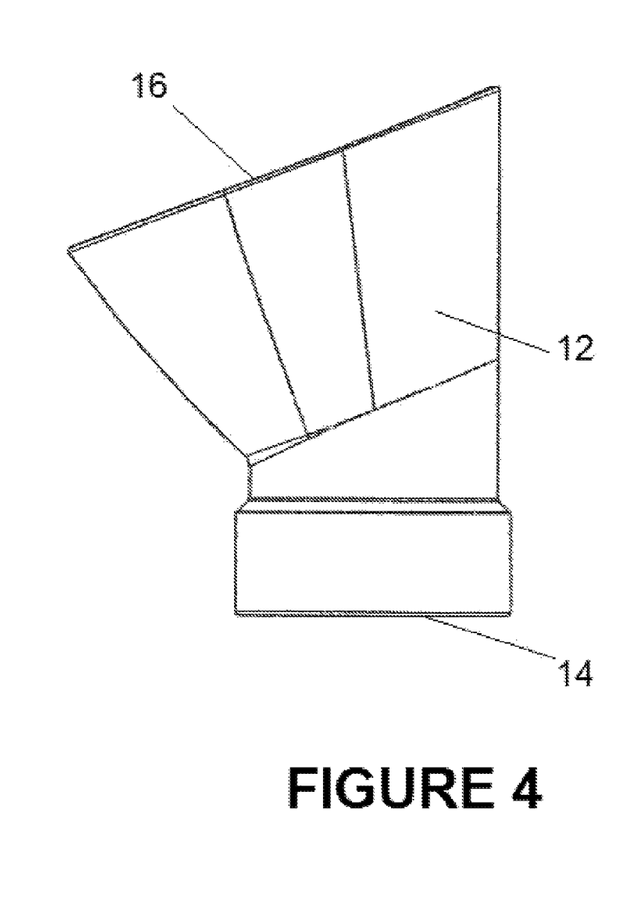
FIG. 4 is a side elevation view of the fish mouth pipe fitting shown in FIG. 1.
Figure 5:
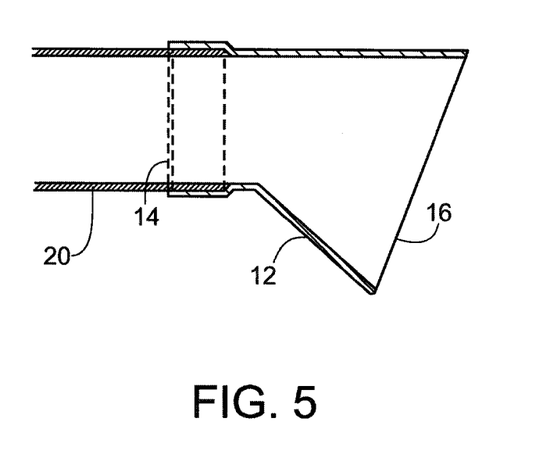
FIG. 5 is a side sectional view of the fish mouth pipe fitting of FIG. 3 shown along the line A-A.
Figure 6:
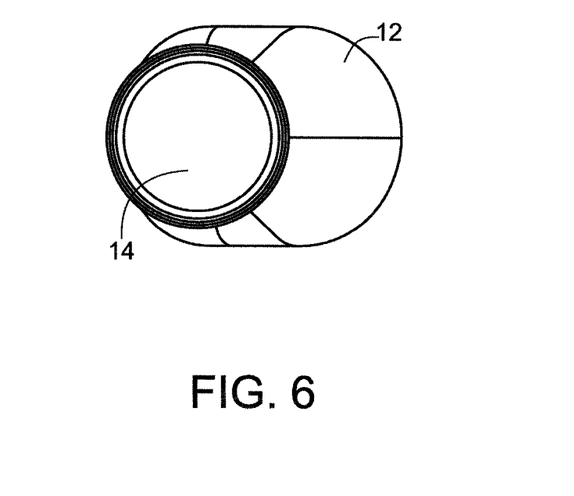
FIG. 6 is a bottom view of the fish mouth pipe fitting shown in FIG. 1.
Figure 7:
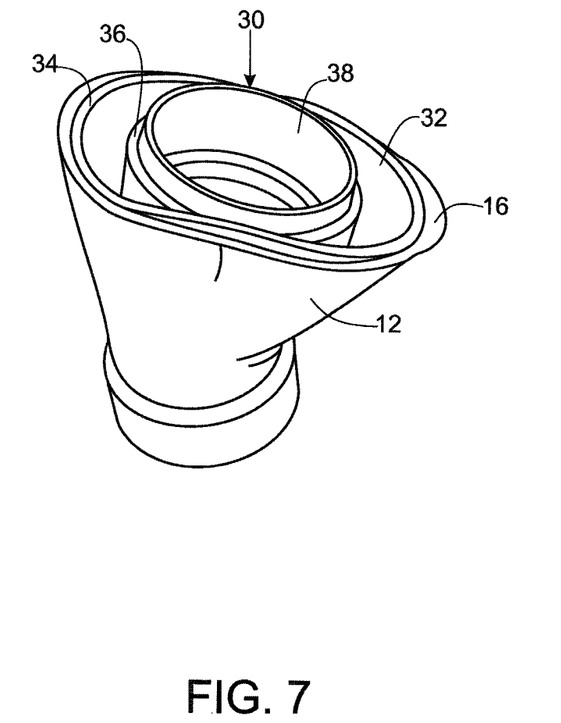
FIG. 7 is a side perspective view of the fish mouth pipe fitting shown in FIG. 1 with a flexible fitting inserted into the fish mouth opening.
Figure 8:
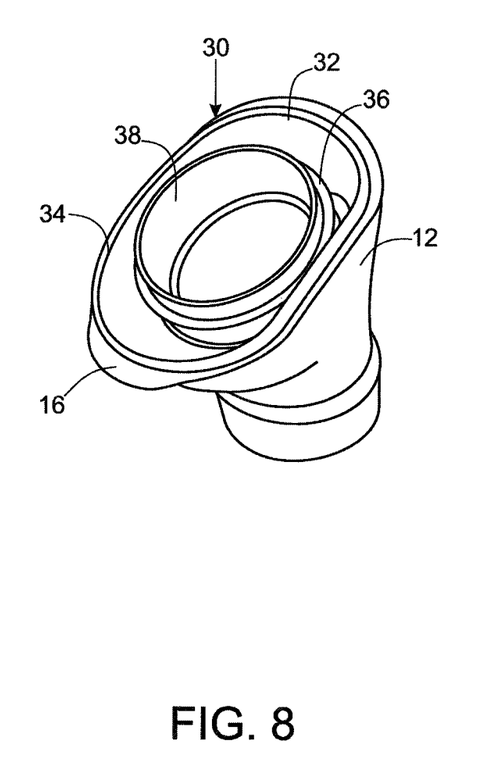
FIG. 8 is a front perspective view of the fish mouth pipe fitting shown in FIG. 1 with a flexible fitting inserted into the fish mouth opening.
Figure 9:
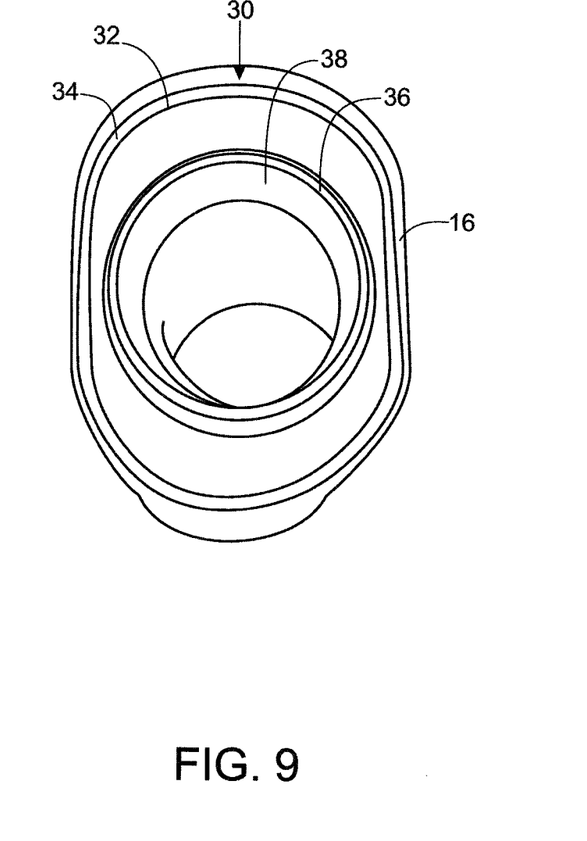
FIG. 9 is a top view of the fish mouth pipe fitting shown in FIG. 1 with a flexible fitting inserted into the fish mouth opening.
Figure 10:
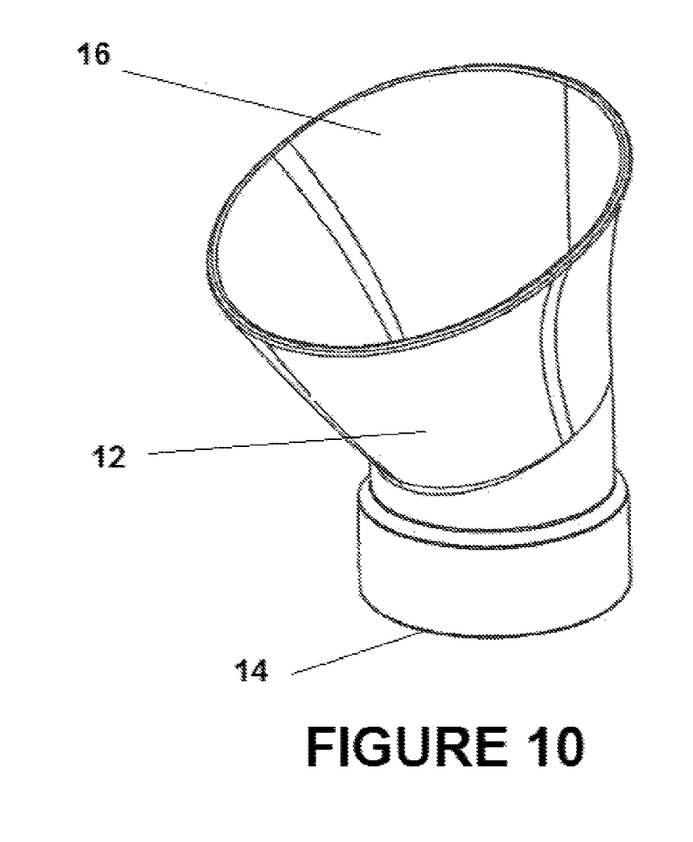
FIG. 10 is a front perspective view of a fish mouth pipe fitting according to an alternative embodiment of the invention.
Figure 11:
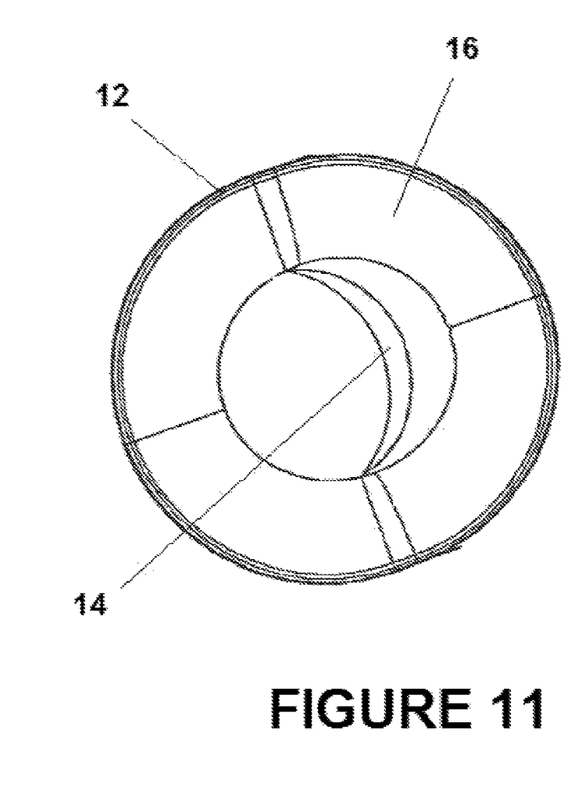
FIG. 11 a top view of the fish mouth pipe fitting shown in FIG. 10.
Figure 12:
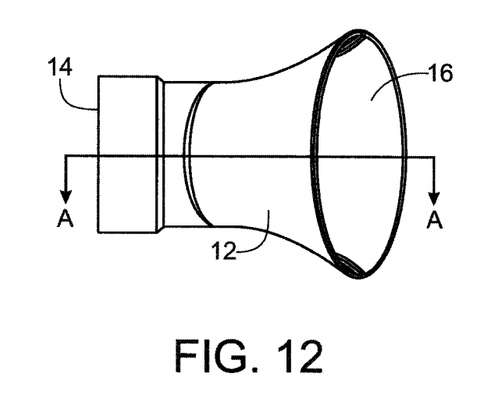
FIG. 12 is a front elevation view of the fish mouth pipe fitting shown in FIG. 10.
Figure 13:
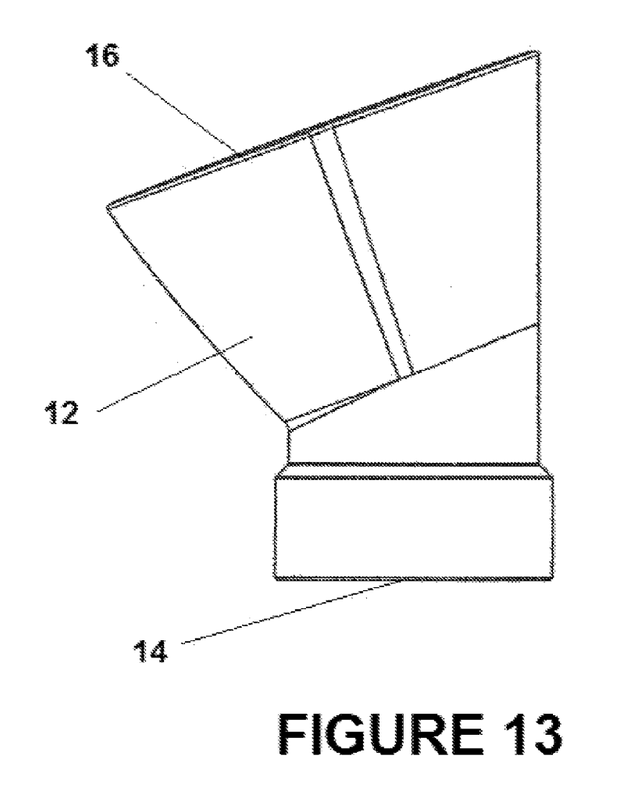
FIG. 13 is a side elevation view of the fish mouth pipe fitting shown in FIG. 10.
Figure 14:
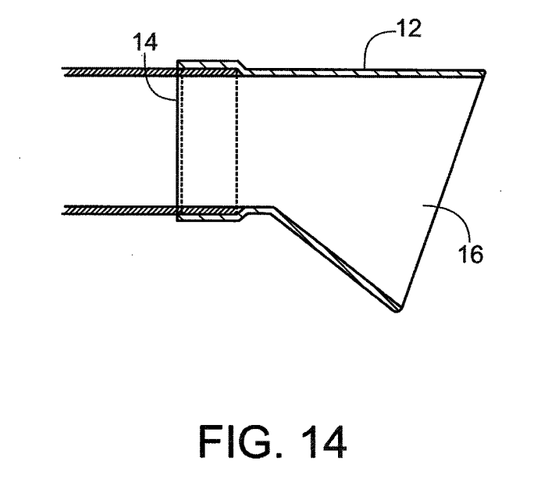
FIG. 14 is a side sectional view of the fish mouth pipe fitting of FIG. 12 shown along the line A-A.
Figure 15:
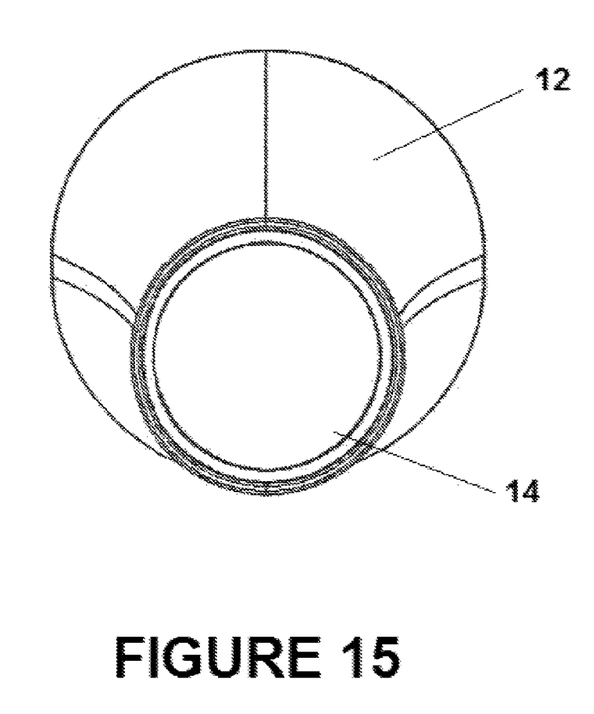
FIG. 15 is a bottom view of the fish mouth pipe fitting shown in FIG. 10.
Figure 16:
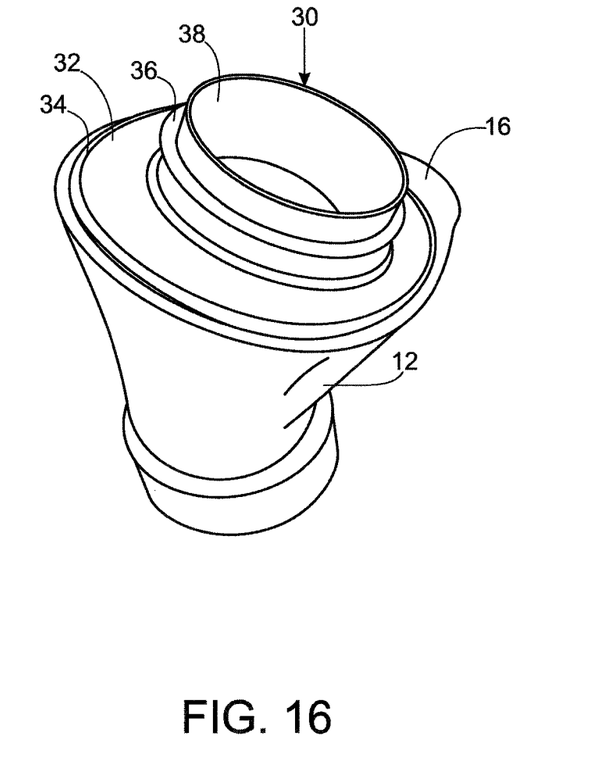
FIG. 16 is a side perspective view of the fish mouth pipe fitting shown in FIG. 10 with a flexible fitting inserted into the fish mouth opening.
Figure 17:
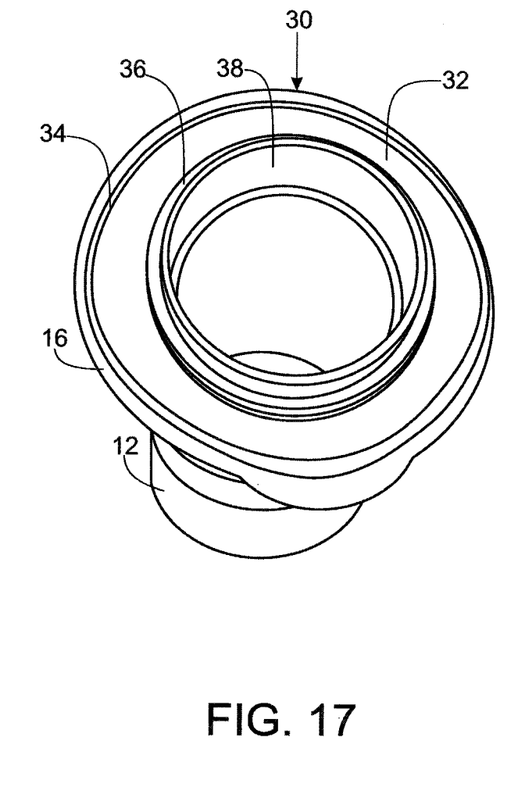
FIG. 17 is a top view of the fish mouth pipe fitting shown in FIG. 10 with a flexible fitting inserted into the fish mouth opening.

As shown in FIGS. 7-9, a flexible coupling 30 may be provided in the opening 16 to allow for a pipe to be inserted into the opening 16 at a variety of angles. The flexible coupling 30 may include a first, flexible member 32 having an outer wall 34 with a shape similar to the shape of, and configured to engage, the opening 16, and an inner wall 36 having a substantially circular opening therein for engaging a second, rigid member 38. The second, rigid member 38 has an opening therein for receiving a length of pipe (not shown) to be joined to the length of pipe 20 which is connected to the circular opening 14 in the fitting 12. Alternatively, the opening in the inner wall 36 may be sized to receive the length of pipe (not shown) without the need for a second rigid member 38.

The first, flexible member 32 is formed of a polymeric material that is strong, resilient and unaffected by soil conditions. The material must also be resistant to chemicals, ultraviolet rays, fungus growth, and normal sewer gases due to the inert nature and physical properties of the material. The material must also be leak-proof, root-proof and seal against infiltration and exfiltration. According to one preferred embodiment of the present invention, the first, flexible member 32 is made of elastomeric polyvinyl chloride (PVC).

The outer wall 34 of the first flexible member 32 is secured and sealed against the inner wall of the opening 16. Similarly, the inner wall 36 of the first flexible member 32 is secured and sealed against the outer surface of the second rigid member 38. Preferably, some type of water-resistant or water-proof adhesive, such as PVC cement, that will bond to the two different materials is used.

The pipe connector 10 preferably comes pre-assembled in that the outer wall 34 of the first flexible member 32 has been pre-glued to the opening 16 of the primary fitting 12 and the inner wall 36 of the first flexible member 32 has been pre-glued to the outer surface of the second rigid member 38. Use of the pipe connector 10 at this point is as simple as priming one end of the outer surface of the pipe 20 and the inner surface of the circular opening 14. Glue or PVC cement is then applied to the outer surface of the end of the pipe 20 and/or the inner surface of the circular opening 14. The end of the pipe 20 is then inserted into the circular opening 14 and given a quarter turn. Once the glue/cement is dry, primer is applied to both the inner surface of the second rigid member 38 and the outer surface of the second pipe (not shown). Glue or PVC cement is then applied to the inner surface of the second rigid member 38 and outer surface of the second pipe (not shown), and the end of the second pipe is inserted into the second rigid member 38 and given a quarter turn. Once the glue is dried, the fitting is ready for use.

The primary fitting 12 and second, rigid member 38 are preferably formed of a plastic material such as PVC or CPVC. Other plastics, such as ABS, SDR 21, SDR 26, SDR 35 as well as others that may now, or in the future be used in plumbing applications, may also be used. Other rigid or semi-rigid materials other than plastics, such as metals or composite materials, are also contemplated.

An alternative embodiment of the present invention is shown in FIGS. 10-17. This alternative embodiment is identical to the preferred embodiment shown in FIGS. 1-9, with the exception of the shape of the enlarged opening 16, and the shape of the corresponding outer wall 34 of the first flexible member 32. Instead of a fish-mouthed shape, the enlarged opening 16 and outer wall 34 according to the alternative embodiment are substantially cone shaped. In all other respects, the alternative embodiment is identical to the preferred embodiment of FIGS. 1-9, wherein like reference numerals indicate like components. As such, to avoid repetition, a specific description of the remaining components of the alternative embodiment will not be discussed.

The foregoing is provided for purposes of illustrating, explaining, and describing embodiments of the present invention. The specific components and order of the steps listed above, while preferred is not necessarily required. Further modifications and adaptation to these embodiments will be apparent to those skilled in the art and may be made without departing from the scope or spirit of the invention.

The invention claimed is:

1. A fitting used in pipe plumbing systems to connect a first length of pipe to a second length of pipe at an arbitrary angle comprising:
   a primary plumbing pipe fitting having a substantially circular opening at a first end thereof for receiving an end of said first length of pipe, and an enlarged opening at a second end thereof, said enlarged opening being large enough relative to an outer diameter of the second length of pipe to permit the second length of pipe to be oriented at an arbitrary angle relative to the primary pipe fitting, wherein the size of the opening gradually decreases from the enlarged opening at the second end toward a point near the circular opening at the first end; and
   a first flexible plumbing pipe coupling member positioned in the enlarged opening, said first flexible coupling member having an outer wall having an outer surface engaging an inner surface of the enlarged opening, and an inner wall having a lower end connected to a lower end of the outer wall, said inner wall further including a substantially circular opening therein for receiving an end of said second length of pipe to permit the second pipe to be inserted therein at an arbitrary angle relative to the primary pipe fitting; and
   a second, rigid member having an outer surface engaging the substantially circular opening of said inner wall of said first flexible coupling member, and an inner surface for receiving the end of the second length of pipe.

2. The fitting of claim 1, further comprising adhesive interposed between the first flexible coupling member and the enlarged opening, and between the first flexible coupling member and the second, rigid member for bonding said components together.

3. The fitting of claim 1, wherein the first, flexible member is formed of a polymeric material that is resilient and unaffected by soil conditions.

4. The fitting of claim 3, wherein the polymeric material is inert and resistant to chemicals, ultraviolet rays, fungus growth, and sewer gases.

5. The fitting of claim 3, wherein the polymeric material is leak-proof, root-proof and seals against infiltration and exfiltration.

6. The fitting of claim 3, wherein the polymeric material is elastomeric polyvinyl chloride (PVC).

7. The fitting of claim 1, wherein the primary fitting and the second, rigid member are formed of a rigid plastic material.

8. The fitting of claim 7, wherein the rigid plastic material is selected from a group consisting of PVC, CPVC, and ABS.

9. The fitting of claim 1, wherein the enlarged opening is substantially oval shaped.

10. The fitting of claim 1, wherein the enlarged opening is substantially cone shaped.

11. The fitting of claim 1, wherein the arbitrary angle is between 0 degrees and 42 degrees.

* * * * *